Nov. 29, 1966  R. FAVRE  3,289,021
ROTARY ELECTRIC MACHINE
Filed Dec. 3, 1963  2 Sheets-Sheet 2
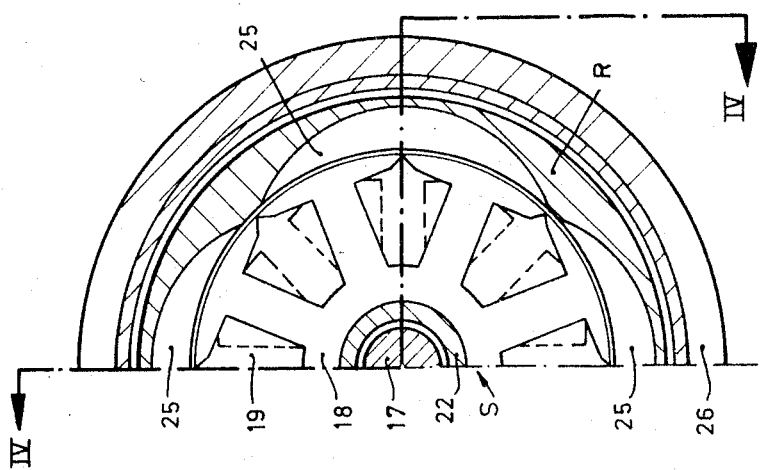
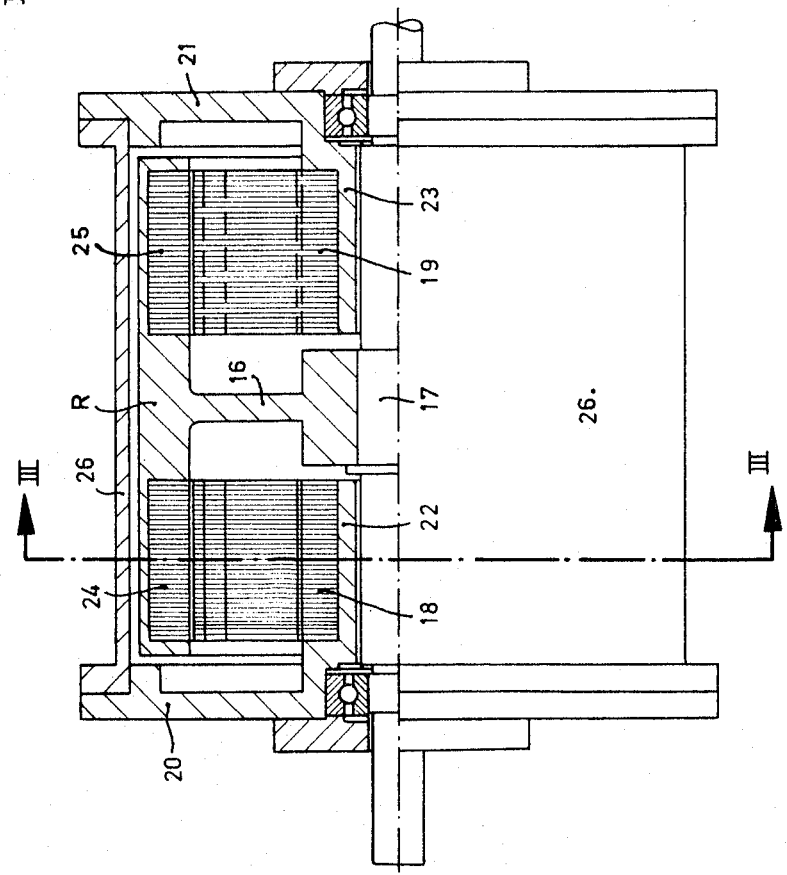
INVENTOR:
Robert FAVRE
by: J. Delattre-Seguy
Attorney

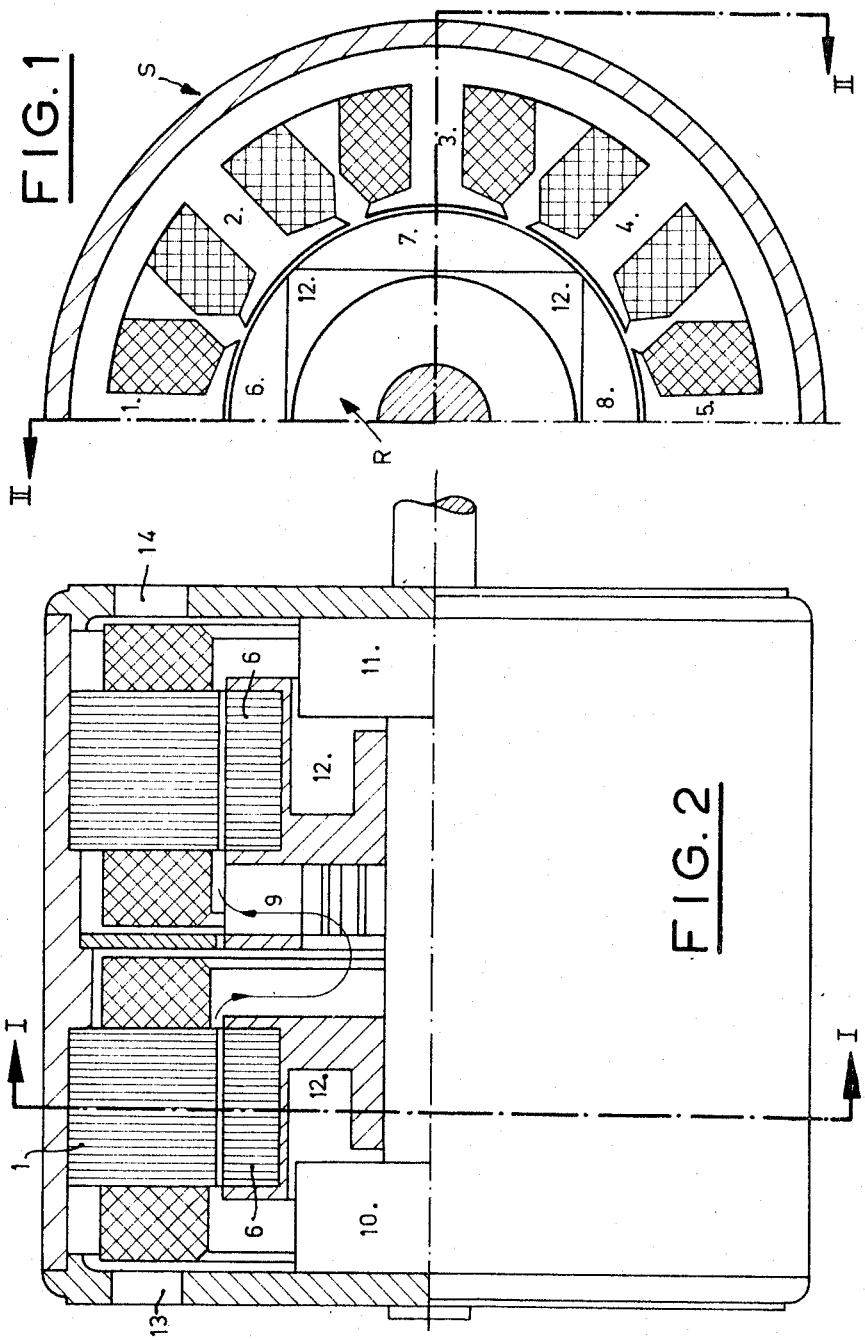

United States Patent Office 3,289,021
Patented Nov. 29, 1966

3,289,021
ROTARY ELECTRIC MACHINE
Robert Favre, Lausanne, Switzerland, assignor to Golay, Buchel & Cie. S.A., Malley-Lausanne, Vaud, Switzerland
Filed Dec. 3, 1963, Ser. No. 329,347
Claims priority, application Switzerland, Dec. 3, 1962, 14,145/62
1 Claim. (Cl. 310—168)

The invention has for its object an electric machine, which can be used as a motor or a generator having a rotor and with field and induced poles. According to the invention the field poles and the induced poles are rigid with one another and are advantageously secured together on the stator, while the control of the magnetic flux in each induced pole is obtained by directing the flux of the field poles of opposite polarities alternatively into said induced poles by means of suitably sized magnetizable armature sections advantageously fitted on the rotor.

According to an advantageous feature of the invention the field poles and the induced poles are arranged in alternation while any two successive field poles have opposite polarities. The field poles are permanently energized and may be constituted by permanent magnets or by electromagnets, whereas the induced poles lying between them are energized periodically during operation of the machine as a motor, by a suitable, preferably electronic, commutator. The magnetizable sections on the rotor act as magnetic bridges which, upon rotation of the rotor, direct alternatingly the flux of one field pole of one polarity and then the flux of one field pole of an opposite polarity into the same induction poles in succession.

The stator is advantageously of a one-phase type; in other words, all the windings on the induced poles are simultaneously energized. The control of the connections is performed advantageously by a member rotating with the rotor, for instance a screening disc provided with an opening which controls the electromagnetic coupling or else the illumination of the detector section of an electromagnetically or photoelectrically operating commutator switch.

The invention will be illustrated with further detail with reference to the accompanying drawings, wherein:

FIG. 1 is a partial cross-section through line I—I of FIG. 2.

FIG. 2 is a partial longitudinal cross-section through line II—II of FIG. 1 of a first embodiment provided with an inner rotor.

FIG. 3 is a partial cross-section through line III—III of FIG. 4 of a second embodiment provided with an outer rotor.

FIG. 4 is a partial longitudinal cross-section through line IV—IV of FIG. 3 of the said second embodiment.

Turning to FIGS. 1 and 2, first embodiment shows a stator with eight poles of which only five poles 1 to 5 are shown in the drawings. The poles 2 and 4 form induced poles, while the poles 1, 3, 5 are the field poles which are energized in the embodiment illustrated through electromagnetic means.

The rotor R is provided along its periphery with uniformly distributed magnetizable armature sections the number of which corresponds to that of the pairs of poles on the stator, that is in the case considered four armature sections of which only those 6, 7, 8 are shown by the drawings. Said armature sections are given cross-sectionally the shape of segments of a circle covering the periphery of the rotor. It is of advantage for these armature sections to be constituted by overlapping soft iron sheets. In order to prevent as far as possible parasitic fluxes outside the armature sections, the latter are embedded inside a protecting electromagnetic screen 12 which may consist of a body of aluminum. The size of the armature sections is selected in a manner such that, for the position of the rotor illustrated in FIG. 1, the flux passing out of any field pole is directed in equal parts towards the polar surfaces of the two adjacent induced poles and this is performed in a manner such that the two halves of two successive induced poles nearest one induced pole face the two ends of the corresponding armature section on the rotor, while the two other halves of these same two induced poles lie in the area corresponding to the next further armature sections. The spacing between two successive armature sections along the periphery of the rotor is selected so as to be as small as possible in order to obtain an optimum guiding of the flux.

When the machine is operating as a motor, the induced poles are energized periodically by means which are not illustrated, preferably through connections incorporating semiconductors which are controlled in a well-known manner, without any contact being required, through a member rotating in unison with the rotor and operating inductively, electromagnetically, photoelectrically or otherwise.

The field poles 1, 3, 5 which are permanently energized are given polarities of alternatingly opposite polarities. Thus, upon rotation of the rotor, the flux passing out of one field pole is guided onto the two nearest adjacent induced poles through the armature sections passing in front of the field pole considered and thus each induced pole is fed in succession first by the flux passing out of one adjacent field pole and then by the flux of an opposite direction passing out of the next adajacent field pole. When the machine is operating as a generator, this allows obtaining in the induced pole an induced voltage which is substantially rectangular since by reason of the structure and arrangement of the armature sections on the rotor, the reversal of the flux in the induced poles in substantially immediate.

In the example illustrated, the field poles and the induced poles are arranged in alternation and the polarities of any two successive field pole are opposed. In principle, it is possible to modify the structure and position of the armature sections so as to allow different arrangements of the stator poles, that is of the field poles and induced poles.

In FIG. 2 the machine includes two adjacent stators and also two rotors keyed to the same shaft and the two stator structures are angularly shifted with reference to each other so that the idle points in the areas of reversal of the voltage in each rotor are cut out and, in whatever position the double rotor is stopped, self-starting of the machine operating as a motor is ensured. In the longitudinal cross-section according to FIG. 2, an armature section 6 in each rotor as well as a field pole 1 of one stator and also a pole in the other stator which is angularly shifted with reference to the first stator, are shown. Instead of the two stators, it is of course possible to angularly shift the two rotors as desired with reference to each other in a manner such as to cut out the inoperative areas for the double rotor. In addition to the arrangement of the stator which has been illustrated, the machine is provided with the above-mentioned electronic communtator which is not illustrated and which serves for the periodical energization of the induced poles. As illustrated also in FIG. 2, the bearings 10 and 11 for the motor shaft may be provided within the rotor space whereby it is possible to obtain a very small size for the machine.

A turbine 6 arranged between the two rotors is adapted to produce a stream of air flowing in the direction of the arrow through the machine, said stream entering through the opening 13 in one transverse end and passing out of the machine through the opening 14 in the opposite transverse end of the machine. The rotor can be made extremely light so that by reason of the very small momentum of the movable parts, it is possible to obtain very high speeds of rotation.

When operating the machine as a motor, the speed of revolution may be adjusted very simply through a permanent gradual adjustment of the voltage energizing the field poles. This possible range of rotary speeds can be furthermore increased by connecting the windings on the induced poles selectively in series, in parallel or in series parallel; when the possibility of the constant modification in the speed of revolution is irrelevant, the electromagnetically energized field poles illustrated in the embodiment disclosed may be replaced by permanent magnets. The arrangement of said field poles on the stator makes it possible to obtain an optimum geometrical distribution of the magnetic circuits so that with the aid of suitable high grade permanent magnetic alloys, the induction values of which may rise up to 12,000 gauss, substantially more intense magnetic fields may be obtained than would be possible with field poles fitted on the rotor.

In addition thereto, it is possible to reduce the lengths of the arc along which the field poles extend, for instance down to one half of the corresponding arc occupied by the induced poles so that the yield of the machine is still further increased. As a motor having a field synchronized through electronic switching and having its self-starting properties, the machine of the type disclosed may serve as an electromagnetic transformer which may be used for many applications with high efficiency.

When the machine operates as a generator, the output voltage may be adjusted conveniently without resorting to any brush since it is possible to modify the energizing or field voltage of the electromagnetically energized field poles. The arrangement of the field poles on the stator allows furthermore obtaining a high number of ampere-turns.

Through the application of the machine as a generator with two or more one phase stators angularly shifted with reference to one another and with a corresponding number of rotors carried by a common shaft, as in the case described of the operation as a self-starting motor, it is possible to obtain simply and efficiently a multiphase voltage, the number of phases corresponding to the number of stators and the phase shifting being given out by the geometrical angle by which the stators are shifted with reference to one another; whereas the conventional polyphase generators the different phase windings must be carried in a comparatively intricate manner by one stator, a multiphase generator of the type described allows an easy execution by means of a number of similar simple one-phase stators.

A two-phase generator is for instance particularly suitable as a generator for charging a vehicle battery, the two phases of the voltage allowing a reduction of the A.C. components beyond the rectifying stage. The poles on the machine may be provided with short-circuiting rings of the type known in the art, which serve for reducing or cutting out the alternating flux component produced by the reaction of the armature sections.

A further embodiment of the invention illustrated in FIGS. 3 and 4 is intended for particularly large machines and by reason of an efficient utilization of space, it is highly advantageous. In this case, the structures of the stator and of the rotors are interchanged. The stator structure S is arranged at the center of the machine and is surrounded by an outer rotor R. This reversal in the arrangement of the stators and rotors allows making a better use of the space extending near the axis of the machine than in the first case illustrated.

In FIG. 4, the rotor R is in the shape of a drum secured to the shaft 17 by means of the transverse web 16. As in the case of the first embodiment, the machine includes again two stators and two rotors rigid with a common shaft, and at the same time the elementary stators or rotors are angularly shifted with reference to each other so as to cut out the idle areas in the operation of the rotor, and thereby self-starting of the machine operating as a motor is obtained or the production of a two-phase voltage when operating the machine as a generator.

In FIG. 3, the shifted position of the stator 19 with reference to the stator 18 is illustrated in interrupted lines.

The stator structure S arranged inside the rotor drum includes two stators 18, 19 which are secured to the two motor flanges 20, 21 through the carrier members 22, 23 surrounding the motor shaft 17. The magnetizable armature sections 24, 25 on the two rotors are given, in this case, a half-moon shape and are embedded in the body of the rotor which is advantageously made of aluminium. The rotor is surrounded by an outer cylindrical casing 26 which is secured to the flanges 20, 21. A stream of cooling air may be fed through the openings in the central web 16 of the rotor, which stream is provided by fan blades which are not illustrated and are secured to the rotor drum.

The embodiment provided with an outer rotor allows a substantial reduction in size of the stamped sheets and lamination stacks required for the stator.

The invention is not limited to the above-described embodiments and the stator and rotor structures, the switching means and the number of phases may be modified as required by the application to be considered. The magnetization armature sections serving as magnetic bridges for reversal of the flux and the common arrangement of all the poles on the stator render possible when operating the machine as a motor or as a generator a speedy reversal of the induced voltage and an optimum geometrical arrangement of the pole system.

What I claim is:

A rotary electric machine comprising a stator, field poles of both polarities and induced poles rigid with the stator, a rotor coaxial with the stator, magnetizable armature sections rigid with the rotor and adapted upon rotation of the rotor to direct the magnetic fluxes produced by field poles of opposite polarities alternatingly into the induced poles, and a short-circuiting ring carried by each field pole and opposing the alternating flux components produced by the reaction of the armature sections.

References Cited by the Examiner
UNITED STATES PATENTS

| | | | |
|---|---|---|---|
| 469,281 | 2/1892 | Sohlman | 310—168 |
| 1,773,074 | 8/1930 | Borreson | 310—168 |
| 2,500,730 | 3/1950 | Yonkers | 310—168 |
| 2,978,599 | 4/1961 | Wilcox | 310—168 |
| 3,179,825 | 4/1965 | Terry et al. | 310—67 |

MILTON O. HIRSHFIELD, *Primary Examiner.*

L. L. SMITH, *Assistant Examiner.*